Jan. 18, 1949.                    W. M. MURRAY                    2,459,448
                         BALL AND SOCKET VEHICLE COUPLING
                              Filed June 26, 1945
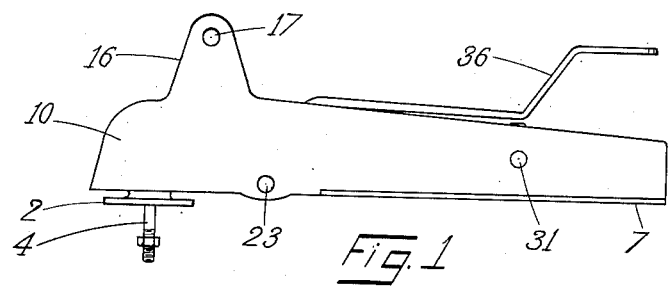
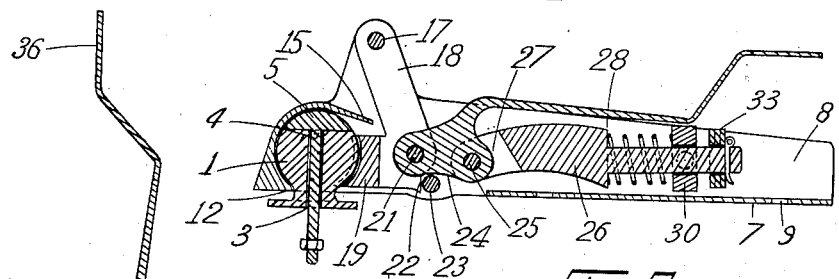
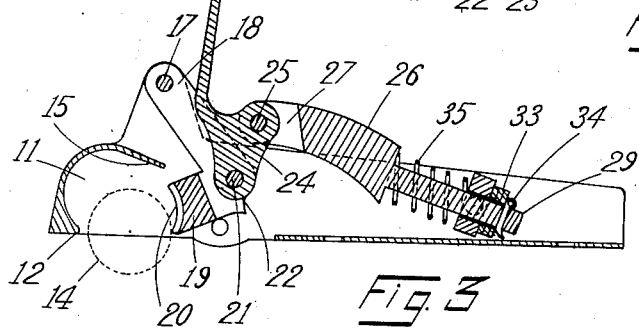
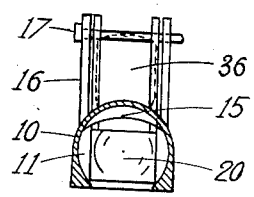
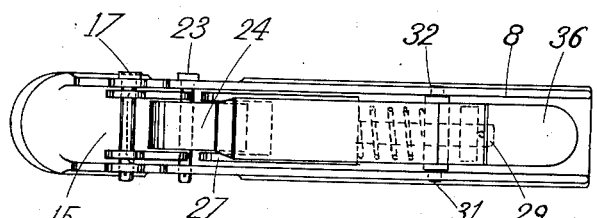
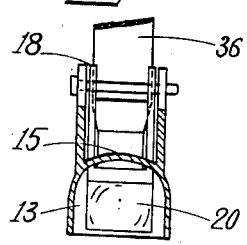
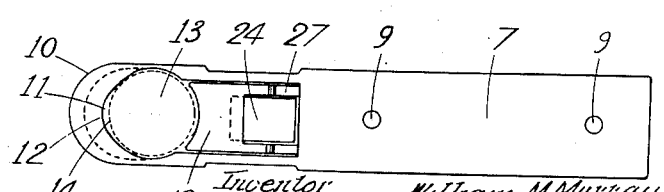
Inventor
William M Murray

UNITED STATES PATENT OFFICE 2,459,448

BALL-AND-SOCKET VEHICLE COUPLING

William Moffet Murray, North Balclutha, New Zealand

Application June 26, 1945, Serial No. 601,652
In New Zealand January 31, 1945

1 Claim. (Cl. 280—33.17)

The present invention relates to connectors for connecting together a hauling vehicle to a hauled vehicle of the known flexible ball and socket type, and is particularly though not solely applicable to connecting together a trailer to a motor vehicle.

The object of the present invention is to provide a connector of the above-mentioned type which enables the vehicles to be attached or detached with a minimum of labour and without the use of tools. Further in the preferred construction the moving operational parts of the connector are substantially housed within the connector body member while in the preferred embodiment of the invention safety means are provided to prevent inadvertent release of the ball member from the connector socket.

A further important advantage according to the present invention lines in the fact that the direct pull is taken mainly by the inner face of the casting or connector body and by no moveable part, while in the preferred construction the form of retaining lip gives a very adequate grip on the ball preventing the ball from being vertically withdrawn.

The aim of this invention is to provide an improved flexible ball and socket type connector—primarily between a motor vehicle and a hauled trailer—the said connector being made to permit attaching and detaching of the vehicles with a minimum of labour and without the use of tools being further characterised by having the moving operational parts of the connector housed substantially within the connector body member and further characterised by safety means to prevent inadvertent release from the connector socket of the ball member.

The connector member is so designed that the pull when hauling, is at least not substantially borne by the moving parts whose function is primarily to complete the socket construction and so to retain the ball member in a flexible grip. Further, the moving parts of the connector member are held in their engagement position under the influence of a compression spring while in the preferred embodiment there is compensation provided for variations in size, within limits, of the ball member, and divergence from strict alignment, as well as providing for wear of the engaging parts. Also, means are preferably provided for adjustment of the spring tension when wear of moving parts or divergence from normal anticipated sizes makes such adjustment necessary.

The body of the connector member is channel shaped in one part so as to enclose the moving parts when the connector socket device is closed with the exception that one of the moving parts so enclosed is extended to form an operating handle which does project above the security of the channel so as to permit hand grip by the user. By this arrangement, the spring and the moving parts are protected from damage and distortion by accidental contact with other features such as falling pieces of the load or other damaging contact which might occur if the said moving parts were exposed above the connector body when closed for hauling function.

Broadly the invention comprises an attachable and detachable connector of the ball and socket type for flexible attachment of a hauling vehicle to a hauled vehicle or the like comprising a ball member with a vertically disposed stem adapted to be attached to one vehicle and a connector body provided with ball clamping means adapted to be attached to the other vehicle, said connector body being so constructed (a) as to enable said ball member to be inserted into or withdrawn from a ball recess formed in its front inner face but to prevent its vertical or substantially vertical withdrawal therefrom by a semi-circular containing lip or flange of less radius than the ball member, and (b) that the direct pull is taken on the front inner face of said connector body member.

The complementary socket parts in the arrangement envisaged comprise a cup faced block member pressed against the ball member by the force of a compression spring acting through a plunger member upon a link end of a handle member when the said handle member is turned down to lie along and in part within the sides of the body part of the connector member; and all arranged that when the said handle member is raised, it withdraws the cup faced block from retaining control of the ball member with the additional provision of a safety pin crossing the body member in such a position as to prevent the opening of the socket device while the safety pin is in place.

That the invention might be the better understood, drawings are appended illustrating a constructional embodiment of the invention in which:

Figure 1 is a side view of a connector combination closed.

Figure 2 is a sectional elevation of Figure 1.

Figure 3 is a sectional elevation of a connector member when open wherein the ball member is indicated by a dotted line circle as in the entering position.

Figure 4 is a plan view of Figure 1.

Figure 5 is an inverted plan view of Figure 3.

Figure 6 is a cross sectional elevation of a connector body in a vertical plane passing through the centre of the socket cavity and with the device in the "closed" position.

Figure 7 is a cross sectional elevation of a connector body in a vertical plane passing through the centre of the ball entering place and with the device in the "open" position.

Referring to the drawings, the ball member of the connector combination is shown in one preferred and suitable constructional adaptation, particularly in Figures 1 and 2 wherein is shown a partly spherical ball 1 having a flanged base 2 and a vertical bolt hole 3 through which passes a bolt 4 having a rounded head 5 of a contour coincident with that of the ball and forming the top thereof. It is preferred that the bolt have a square neck to engage a squared topped bolt hole 3. The bolt 4 is used to secure to ball member integer to the appropriate vehicle part.

The connector member in one preferred and suitable adaptation comprises a body part having a channel shaped part in the form of a flat base 7 with vertical sides 8; bolt holes 9 are provided in the base 7 for attachment to an appropriate vehicle part, preferably that of the trailer vehicle as aforesaid.

As viewed in the drawings, the right hand end of Figures 1 and 2 will be termed the back of the connector member and the left hand end of the figures in the drawings will be termed the front of the connector member.

The vertical sides 8 of the body member are extended beyond the base and join at the front 10 of the connector member and on its inside to form a socket cavity 11. As shown particularly in Figures 2 and 6, the socket cavity is partly spherical to coincide with the outline of the ball member and with the greatest diameter of the ball member contained in the cavity disposed well above the base line of the connector member. From its greatest dameter of contour, the socket cavity continues in a curve round and inwards to meet the base line by the formation of a substantially semi-circular containing lip 12 of less radius than the ball member. The said lip 12 prevents vertical withdrawal of the ball member from the socket cavity, when the ball is pressed forwards against the front wall of the said socket cavity.

The socket cavity, in effect, is continued backwards towards the base member to form an entry point 13 which has no containing lip feature, and in which the full width of the cavity is continued down to the opening at the base line, so as to permit vertical entry and withdrawal of the ball member at a point behind the ends of the semi-circular lip 12. The point of entry and withdrawal is shown by the placing of the dotted circle in Figures 3 and 5. When the ball member enters the space between the vertical sides at the entry point it may be passed upwards and forwards to rest in the socket cavity and be held there by means to be described, and is in part caused to move upwards and forwards by contact with the upwards sloping roof 15 of the cavity.

At a position somewhat behind the entry point 13, the vertical sides are extended upwards to form a pair of lugs 16 pierced by a transverse pivot hole through which passes a pivot pin 17. A tumbler crank is pivotally swung on the pivot pin 16. In one suitable shape the tumbler crank comprises a pair of crank arms 18 pivotally mounted on the pivot pin 17 and housed inside the lugs 16. The crank arms extend in length approximately to the base line of the connector body member and are joined together at their front and lower faces by a crank block feature 19 which on its front face is concave to form a part spherical cup feature 20 shaped to suit the curvature of the ball member.

The position of the cup feature 20 on the crank arms 18 is such that when the block feature 19 is moved forwards against the ball member when accommodated in the socket cavity, then the cup feature 20 will bear against and coincide with the ball member. Holes are formed in the crank arms to accommodate a hinge pin 21 passing transversely across the space between the crank arms. The hinge pin is located behind the block feature 19 and slightly nearer the top pivot pin 17 than is the pressure centre line of the cup feature 20. Below the hinge pin 21 the crank arms are shaped with a flat face to form a heel 22 as is shown particularly in Figure 2 of the drawings. The vertical sides 8 of the connector body part are extended downwards to provide space for transverse safety holes, through which may freely pass a safety pin 23. The location of the holes and the safety pin is such that when the cup feature 20 is bearing against the ball member with the connector in the closed position and gripping the ball member, then the said safety pin 23 will pass immediately behind the heel 22 and prevent backwards movement of the same. By this safety provision, while the safety pin 23 is in position in the safety holes, there is no possibility of the block feature being moved back a sufficient distance for the ball member to be withdrawn from the socket cavity. The safety provision is an important feature of the invention and the location of the safety hole and safety pin as described herein is only one and a preferred location; as it is recognised that alternative positions might be found having equivalent effect to prevent backwards movement of the block feature. When it is desired to disengage the connector from the ball member, the safety pin must be withdrawn as a first step.

Hinged to the crank arms by the hinge pin 21 is a handle member having a base in the form of a link part 24 from which rises a handle 36 shaped as is shown in Figure 2. The link part is made to move freely between the crank arms 18, and through the link part is formed a hinge pin hole through which passes freely the hinge pin 21, and behind it in the link part is formed a hole through which passes freely a pressure pin 25. There is a plunger member 26 having a forked end 27 shaped to straddle the link part 24 and with a pin hole through the sides of the forked end 27 to accommodate the pressure pin 25 by which means the plunger member and the handle are pivotally joined together. The plunger member is disposed backwards between the vertical sides 8 of the connector body part and is reduced in size at a shoulder 28 to form a round stem 29. A guide block 30 is swivelled by integral pins 31 moving in holes 32 in the vertical sides 8 of the connector body. Through the guide block passes a guide hole slidably to accommodate the stem 29, which projects beyond the guide block a sufficient distance to carry a plurality of washers 33 and at its end has a cotter pin 34 or the like. Between the shoulder 28 and the guide block 30 a compression helical spring 35 is arranged around the stem 29.

The crank arms and integral parts, with the link ended handle and the plunger member all together are the moving parts of the connector member, and are so shaped and arranged that when the connector member is closed to grip the ball member of the connector combination as is shown in Figures 1 and 2 then a reaction pressure line drawn from where the face of the ball and the cup part 20 meet and passing through the centre of the hinge pin 21 will pass above the pressure pin 25. In this position, the pressure resultant from the compression of the spring 35 will tend further to depress the pressure pin centre and so prevent the handle rising of its own accord. To free the ball and socket engagement of the connector combination of parts, the handle 25 must be raised against the depressing influence of the spring until the pressure pin passes above the centre line of reaction pressure aforesaid, whereupon the handle is easily raised as the spring pressure tends further to turn the link part on the hinge pin 21 as a pivot. By turning the handle into the upright position as shown in Figure 3, the pressure pin becomes a fulcrum on which the link 24 turns and the hinge pin is moved around the fulcrum in an anti-clockwise direction drawing with it the attached ends of the crank lever and the block feature. The block feature and cup face are drawn backwards a sufficient distance to permit the ball member being withdrawn through the entry point. To achieve this it is necessary to bring the vehicles together the additional short distance as measured between the socket cavity and the entry point. This can be done only if the safety pin 23 is first withdrawn.

To couple two vehicles together using the connector combination of parts according to this invention, the ball member is passed upwards through the entry point and the vehicles separated the small distance necessary to bring the ball member against the inside front wall of the socket cavity. The handle is then turned down into the channel of the body part, which operation, through the link operation as described, forces the cup feature against the ball member. Generally this operation above is sufficient to separate the two vehicles the small distance necessary. The safety pin can then be inserted behind the heel to prevent disengagement of the socket parts holding the ball member.

The connector body part, crank arms piece, handle and link end and the plunger member may all be made of malleable steel or other material having suitable physical properties of tensile strength and freedom from brittleness. The ball part may be a malleable steel or malleable iron casting and the bolt be of steel or wrought iron.

It will be noted by reference to Figures 2 and 3 of the drawings that it is the extension of the helical spring which gives the pressure effect on the moving parts. Should the ball member or socket parts wear or be undersized, then the distance between the shoulder 28 and the guide block 30 may be lessened by forward projection of the plunger, if one or more of the washers be shifted from the outside to the inside of the guide block mounted on the round stem.

I claim:

A trailer or like hitch, including a body formed at one end for one connection of the hitch and at the opposite end with a part ball receiving socket, a block swingingly supported in the body and formed to cooperate with the body part of the socket to complete the ball receiving portion of the hitch, the completed socket having a ball entrance materially less in width than the diameter of the ball, and the ball part of the socket formed in the body having an integral restricted retaining lip to underlie the second hitch connecting element received in the socket, said hitch connecting element being in the form of a ball, means carried by the ball for connecting the ball to the second element of the hitch, a lever pivotally mounted in the body and connected to and for operating the block relative to its socket formation, a spring pressed element in the body for maintaining the lever under yielding pressure, and a pin removably mounted in the body to directly engage the block independent of the lever to hold the block in socket forming relation, said pin being removable to permit block movement in one direction to free the ball member.

WILLIAM MOFFET MURRAY.

REFERENCES CITED

The following references are of record in the file of this patent:

UNITED STATES PATENTS

| Number | Name | Date |
| --- | --- | --- |
| 1,340,521 | Cadman | May 18, 1920 |
| 1,904,387 | Rhodes | Apr. 18, 1933 |
| 2,130,705 | Radeleff | Sept. 20, 1938 |
| 2,204,882 | Berluti | June 18, 1940 |
| 2,217,234 | Rasmussen | Oct. 8, 1940 |